(12) United States Patent
Li

(10) Patent No.: US 8,275,015 B2
(45) Date of Patent: Sep. 25, 2012

(54) PASSIVELY Q-SWITCHED SIDE PUMPED MONOLITHIC RING LASER

(75) Inventor: Steven X. Li, Ellicott City, MD (US)

(73) Assignee: The United States of America as represented by the Administrator of the National Aeronautics and Space Administration, Washington, DC (US)

( * ) Notice: Subject to any disclaimer, the term of this patent is extended or adjusted under 35 U.S.C. 154(b) by 307 days.

(21) Appl. No.: 12/551,212

(22) Filed: Aug. 31, 2009

(65) Prior Publication Data

US 2011/0150012 A1    Jun. 23, 2011

Related U.S. Application Data

(60) Provisional application No. 61/149,537, filed on Feb. 3, 2009.

(51) Int. Cl.
*H01S 3/09* (2006.01)

(52) U.S. Cl. ........... 372/69; 372/66; 372/70; 372/71; 372/72

(58) Field of Classification Search .......... 372/66, 372/69–72

See application file for complete search history.

(56) References Cited

U.S. PATENT DOCUMENTS

| | | | | |
|---|---|---|---|---|
| 4,747,111 | A | * | 5/1988 | Trutna et al. ............ 372/94 |
| 5,007,065 | A | * | 4/1991 | Trutna, Jr. ............. 372/94 |
| 5,027,367 | A | * | 6/1991 | Rea et al. ............. 372/94 |
| 5,148,444 | A | * | 9/1992 | Berger ............... 372/94 |
| 5,177,764 | A | * | 1/1993 | Nilsson .............. 372/94 |
| 5,235,610 | A | * | 8/1993 | Finch et al. ........... 372/92 |
| 6,002,704 | A | * | 12/1999 | Freitag et al. ........... 372/94 |
| 2002/0159496 | A1 | * | 10/2002 | Peressini ............ 372/70 |
| 2006/0018350 | A1 | * | 1/2006 | Adams et al. ............. 372/34 |
| 2006/0268950 | A1 | * | 11/2006 | Kane ............... 372/30 |

* cited by examiner

*Primary Examiner* — Yuanda Zhang

(57) ABSTRACT

Disclosed herein are systems and methods for generating a side-pumped passively Q-switched non-planar ring oscillator. The method introduces a laser into a cavity of a crystal, the cavity having a round-trip path formed by a reflection at a dielectrically coated front surface, a first internal reflection at a first side surface of the crystal at a non-orthogonal angle with the front, a second internal reflection at a top surface of the crystal, and a third internal reflection at a second side surface of the crystal at a non-orthogonal angle with the front. The method side pumps the laser at the top or bottom surface with a side pump diode array beam and generates an output laser emanating at a location on the front surface. The design can include additional internal reflections to increase interaction with the side pump. Waste heat may be removed by mounting the crystal to a heatsink.

20 Claims, 9 Drawing Sheets

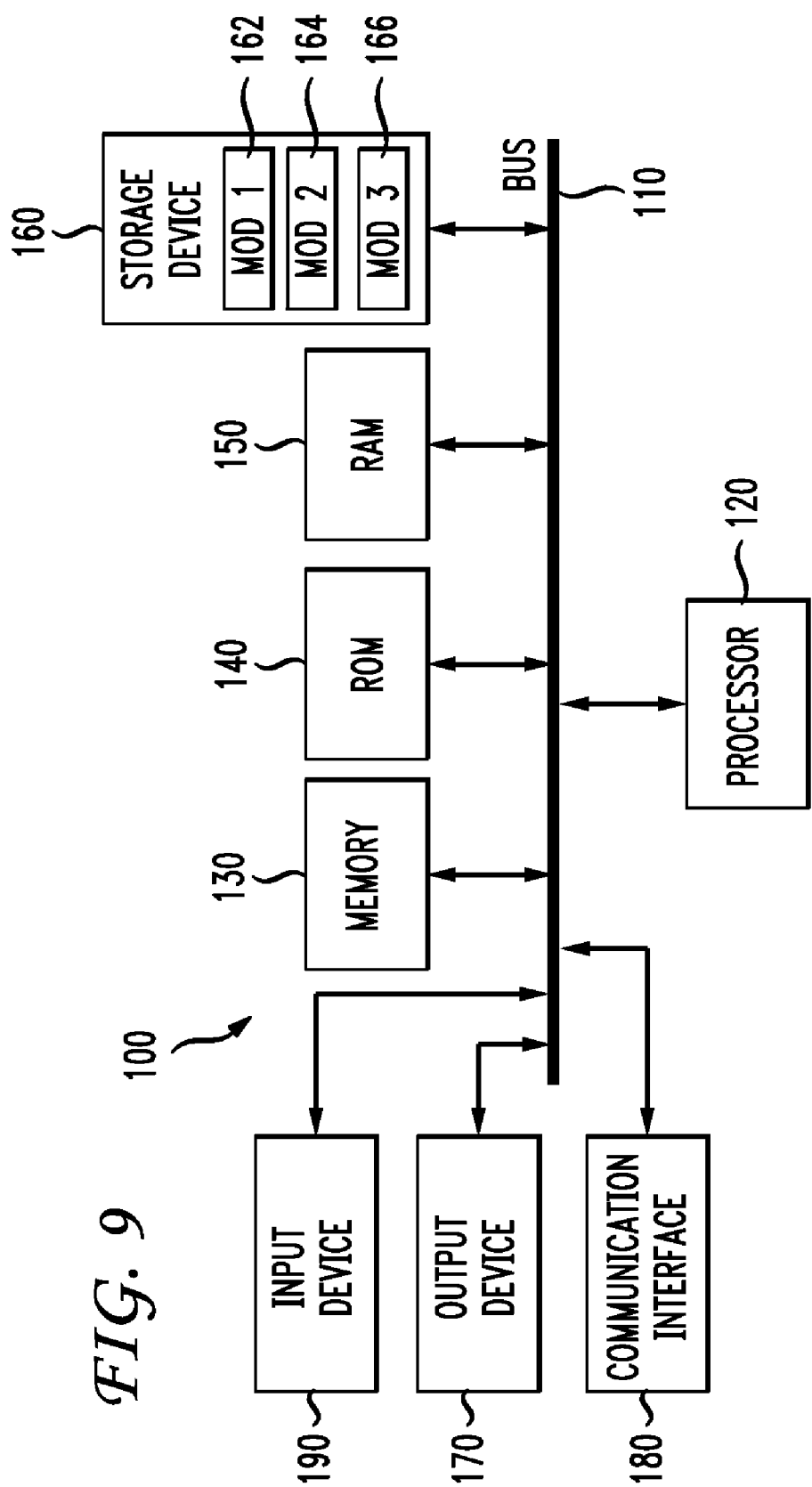

PASSIVELY Q-SWITCHED SIDE PUMPED MONOLITHIC RING LASER

The disclosure described herein was developed by employees of the United States Government and may be manufactured and used by or for the United States Government for governmental purposes without the payment of any royalties thereon or therefore.

BACKGROUND

1. Technical Field

The present disclosure relates to lasers and more specifically to a side pumped, passively Q-switched monolithic ring laser.

2. Introduction

In recent years researchers have devoted considerable effort to develop compact, long-lifetime, and reliable diode-pumped solid state lasers for a variety of applications, including use in space. The National Aeronautics and Space Administration (NASA) has developed several laser-based remote sensing missions such as the Mars Orbiter Laser Altimeter (MOLA), Shuttle Laser Altimeter (SLA), Geoscience Laser Altimeter System (GLAS), Mercury Laser Altimeter (MLA), Cloud-Aerosol Lidar and Infrared Pathfinder Satellite Observation (CALIPSO) satellite, and Vegetation Canopy Lidar (VCL). Despite great science returns, the generally low maturity level of the laser itself frequently stymies space-based laser instrumentation. In several cases, this low maturity level has led to on-orbit failures, major program delays, and even program cancellations. The principal issue driving space based laser applications is achieving high optical output energies. Remote sensing from space involves long optical path lengths which usually are also subject to atmospheric absorption. Any high output energy laser design must also address waste heat management and longitudinal mode beating.

Longitudinal mode beating is a phenomenon that leads to excessive intra-cavity intensities in high peak power Q-switched lasers. This phenomenon occurs when the laser cavity allows several longitudinal modes to coexist, which can constructively interfere and produce intensities high enough to damage optics. The repeated intensity "spiking" during mode beating generates micro-burns on the optics and slowly eats away at the weakest optical elements or coatings, severely degrading the long term reliability of the laser. These energy spikes also increase the probability of damage related to contamination. To prevent longitudinal mode beating in Q-switched laser systems, the laser must be designed to stay in a single longitudinal mode. Not only does single mode operation have zero mode beating, it also has the added benefits of reducing energy fluctuations from pulse to pulse and substantially narrower spectral output. A narrow linewidth, single mode laser enables the receiver system to use much narrower optical filters to reduce the background light; which greatly enhances daytime measurement capabilities. The improved signal to noise ratio reduces the laser power requirements, thus resulting in a much smaller and more reliable system. One potential application of this type of laser is Doppler wind measurements which require single longitudinal mode operation.

An elegant solution to longitudinal mode beating is to employ a ring laser architecture. In this configuration, a laser develops a single running wave and eliminates spatial hole burning, which is the primary underlying phenomenon that leads to the development of multiple longitudinal modes in the laser. A non-planar ring oscillator (NPRO) can be constructed in a monolithic unit, which maintains optical alignment and allows compact operation of the ring laser. Monolithic NPRO designs exist for CW operation, and for low energy per shot passively Q-switched operation. However, many applications, including the majority of space-based laser missions to date, require high shot energies.

Pulse operation of a laser requires Q-switching, which periodically disrupts the resonant cavity of the laser itself, allowing the laser medium to achieve high population inversions. All current active Q-switching methods require high voltage circuitry, associated power supplies and added thermal management; all of which are undesirable in space based instruments. Passive Q-switching employs an optical material known as a saturable absorber. This method allows pulsed operation with no additional power or circuitry, and requires very little additional thermal management.

Existing monolithic CW and passive Q-switched NPRO lasers employ end-pumping where the pump light is injected into the laser cavity along the optical axis of the NPRO laser itself at one of the facets of the crystal. This method has limited the output energies of passively Q-switched monolithic NPRO lasers for two reasons. The most important issue is that high power end pumping introduces strong thermal lensing effects in the monolithic unit, which degrades the laser stability and beam quality. The second issue is that suitable single emitter laser diode pump sources are limited in output energy.

Thermal management is a major issue affecting all laser designs, but is especially burdensome to designers of space based laser systems. The vacuum of space eliminates convection as a thermal path and the difference between sunlight and shade is extreme. Substantial waste heat can be produced in a laser due to unabsorbed pump light and inefficiencies in the laser itself. Excessive heat can lead to optical misalignment, changes in optical material characteristics, beam pointing errors, out-gassing of contaminants, and even complete system failure.

SUMMARY

Additional features and advantages of the disclosure will be set forth in the description which follows, and in part will be obvious from the description, or can be learned by practice of the herein disclosed principles. The features and advantages of the disclosure can be realized and obtained by means of the instruments and combinations particularly pointed out in the appended claims. These and other features of the disclosure will become more fully apparent from the following description and appended claims, or can be learned by the practice of the principles set forth herein.

Disclosed are methods (and other embodiments such as a system that generates a laser and a computer readable medium storing instructions for causing hardware components to generate a laser according to the principles disclosed herein) for generating a high energy single longitudinal and transverse mode pulsed laser by side pumping a non-planar ring oscillator (NPRO) with high power laser diode arrays. One example crystal is a neodymium-doped yttrium aluminum garnet (Nd:YAG) crystal. Pulse operation is achieved by introducing a saturable absorber such as chromium doped yttrium aluminum garnet ($Cr^{4+}$:YAG) into the laser beam path to achieve passively Q-switched operation. The saturable absorber can be diffusion bonded to the laser crystal to form a monolithic unit. A commercially available diode array bar is 1 cm long and can produce 20 W in CW mode and over 100 W in quasi-CW mode operation. Multiple bars can be packaged to form an array with much higher pump power. A cylindrical lens can be used to focus the pump beam into the laser crystal from the top or bottom of the crystal. The pump beam is positioned to overlap with the laser beam to achieve high operational efficiency. In the pump region, the laser beam goes through a zig-zag path which effectively reduces thermal lensing effects in the laser crystal.

The laser can be pumped with a CW pump laser for high repetition rate operation or it can be pumped by a quasi-CW pump laser to achieve high output energy pulse operation. For high energy applications, an auxiliary pump laser can also be used to simultaneously end pump the laser to control the transverse mode. A low power short pulse laser can also be introduced into the laser cavity to reduce the laser pulse to pulse jitter. This could be very important for timing critical applications. The low power end pump will also force the ring laser to oscillate in one direction. The laser can operate in single longitudinal and/or transverse mode. Waste heat can be extracted from the NPRO laser crystal by mounting the crystal to a heat sink on the bottom or top of the crystal. Heat extraction would generally be done on the face of the crystal opposite to the pump face, such as with a heat sink. The crystal can be Nd:YAG. The laser includes a passive Q-switch by incorporating a saturable absorber material in the laser cavity. The passive Q-switch material can be $Cr^{4+}$:YAG. An additional end-pump can be introduced to achieve increased spatial mode stability. The laser can operate in single longitudinal or transverse mode.

BRIEF DESCRIPTION OF THE DRAWINGS

In order to describe the manner in which the above-recited and other advantages and features of the disclosure can be obtained, a more particular description of the principles briefly described above will be rendered by reference to specific embodiments thereof which are illustrated in the appended drawings. Understanding that these drawings depict only exemplary embodiments of the disclosure and are not therefore to be considered to be limiting of its scope, the principles herein are described and explained with additional specificity and detail through the use of the accompanying drawings in which:

FIG. 9 illustrates an example system embodiment.

DETAILED DESCRIPTION

Various embodiments of the disclosure are discussed in detail below. While specific implementations are discussed, it should be understood that this is done for illustration purposes only. A person skilled in the relevant art will recognize that other components and configurations may be used without parting from the spirit and scope of the disclosure.

Figure 1:
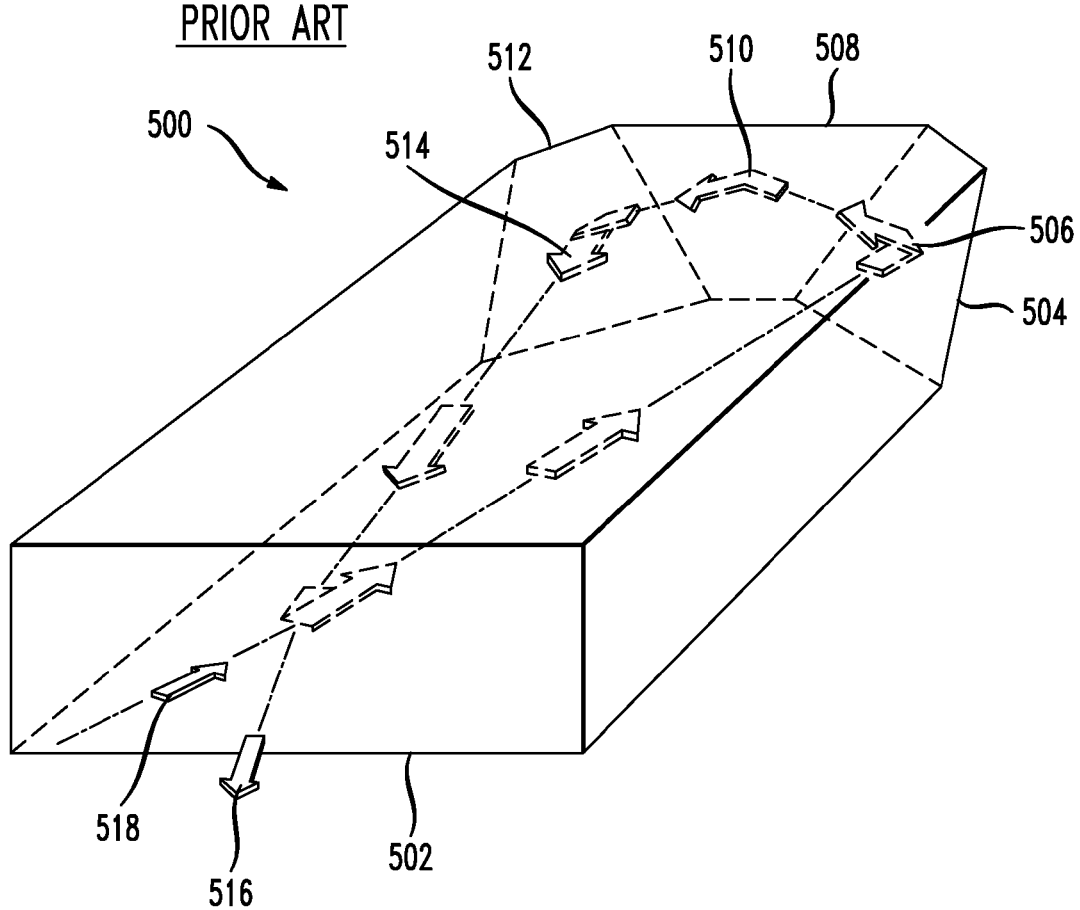
FIG. 1 illustrates an example round trip path in an NPRO crystal in a three dimensional view.

FIG. 1 illustrates an example round trip path of prior art in an end-pumped NPRO crystal 500 in a three-dimensional view to better illustrate the reflections or bounces of the round trip path. The pump laser 518 enters at a front surface 502 of the crystal 500. A cavity round-trip path is formed by reflection at the surface 502, by total internal reflection 506 at a first angled surface 504. The laser path travels upward and bounces 510 off the top surface 508 of the crystal 500 and then travels downward. It then bounces 514 off a second angled surface 512 and travels back toward the front surface 502 of the crystal 500 to form a cavity. The partial reflection coated surface 502 serves as an output coupler. The laser output 516 exits at the front surface 502.

Figure 2:
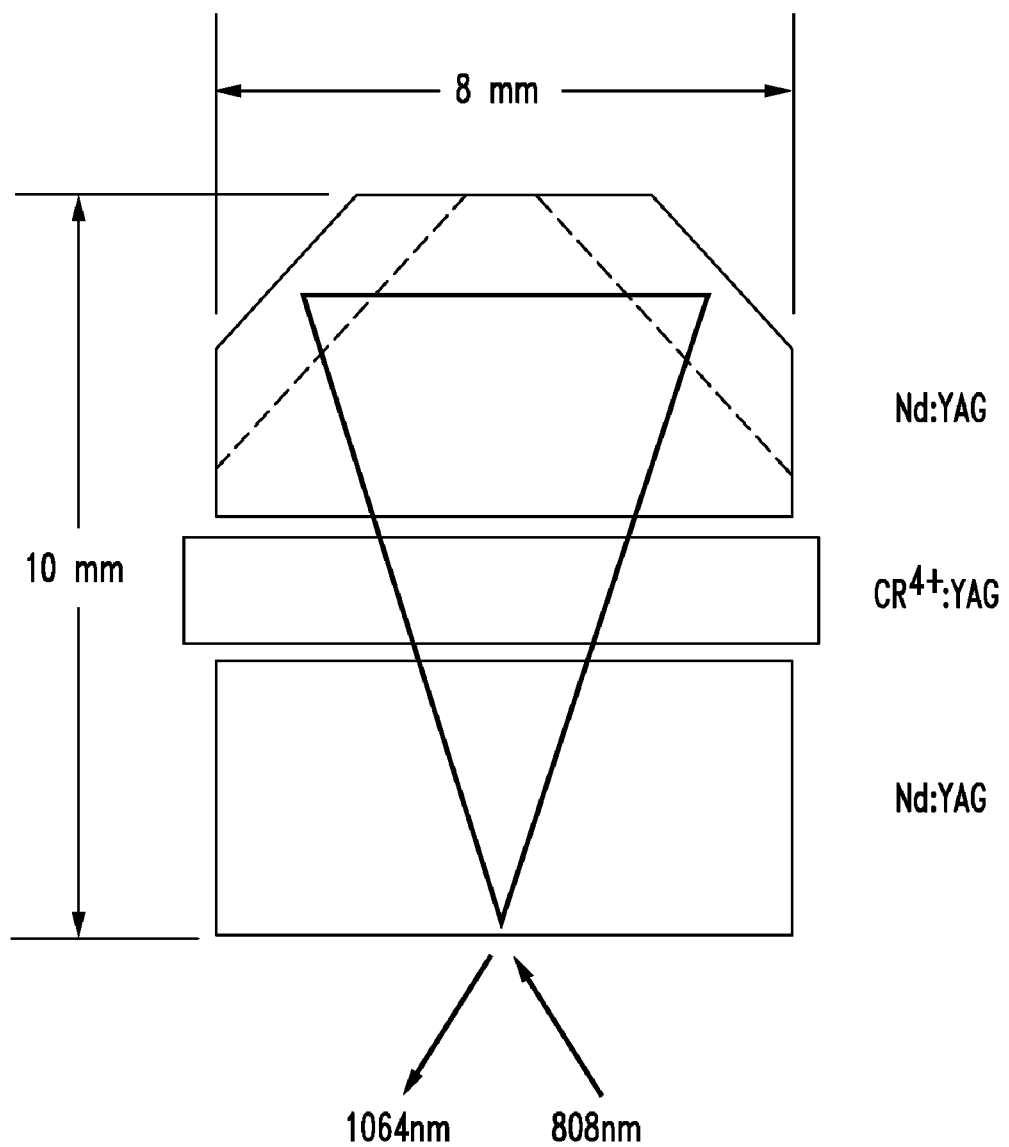
FIG. 2 illustrates the prior art end pumped, q-switched monolithic non-planar ring oscillator architecture.

FIG. 2 illustrates the prior art, passively q-switched, end-pumped nonplanar ring oscillator (NPRO) architecture. The monolithic crystal is cut into two pieces, with the Nd:YAG—air surfaces antireflection coated at 1064 nm. A cavity round-trip path is formed by reflection at the dielectrically coated front surface and by three total internal reflections at the two tilted side surface and at the top surface. The passively q-switched operation of the ring laser is obtained by inserting a saturable absorber, such as $Cr^{4+}$:YAG, into the gap between the two Nd:YAG crystals.

Figure 3:
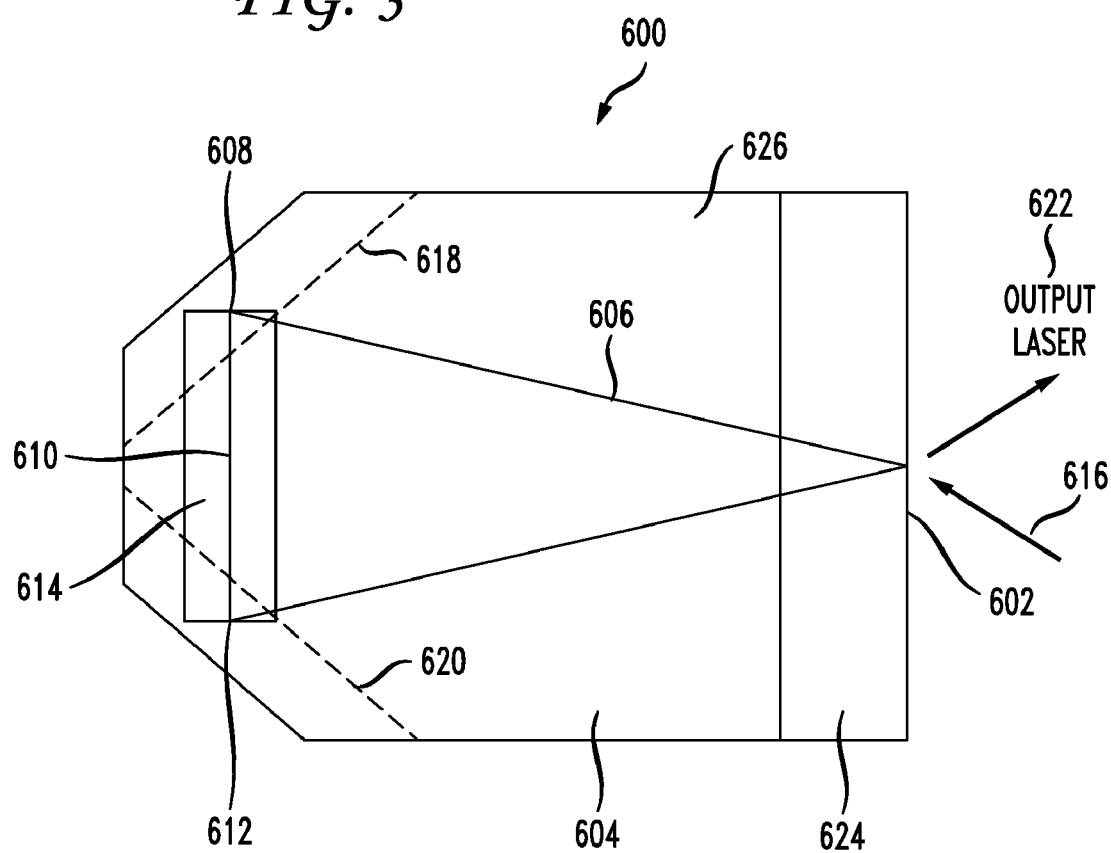
FIG. 3 illustrates an exemplary side pumped NPRO crystal.

With reference to FIG. 3, an exemplary side pumped NPRO crystal 600 in accordance with the principles disclosed herein. In one aspect, the crystal is a neodymium-doped yttrium aluminum garnet (Nd:YAG) crystal. FIG. 3 illustrates a side pumped, passively Q-switched, monolithic Nd:YAG ring laser. The laser can operate in single longitudinal and/or transverse mode. The laser can be a modification of the highly reliable, well known monolithic nonplanar ring oscillator (NPRO) architecture. A cavity round-trip path 606 is formed by reflection at the dielectrically coated partial reflection front surface 602 which serves as output coupler of the laser and by three total internal reflections 608, 610, 612 at the two tilted side surfaces 618, 620 and at the top surface 604. The laser is side pumped through the top surface by a diode array 614. The pump beam from diode array 614 is aligned to the surface formed by 608, 610 and 612. The top surface 604 is antireflection coated and the bottom surface 626 is high reflection coated at pump wavelength. The unabsorbed pump light from the first pass through the Nd:YAG crystal is reflected back from the bottom surface to increase the total pump beam absorption. A saturable absorber ($Cr^{4+}$:YAG) 624 is optically bonded to the end of the Nd:YAG crystal 600 to achieve passive Q-switched operation. To ensure oscillation in a single transverse mode, a cylindrical lens can focus the pump diode array 614 beam on to a Nd:YAG crystal or other suitable crystal. The bottom surface 626 of the crystal can be bonded to the temperature controlled heat sink to keep the crystal at constant operating temperature. The crystal 600 generates an output laser 622 from the front surface 602. Other suitable laser materials and saturable absorber materials can be substituted for Nd:YAG and $Cr^{4+}$:YAG respectively. The pump light can be applied from the bottom of the crystal instead of the top if so desired. In this case, the heat would be removed from the top rather than the bottom and the optical coatings would be modified appropriately. The pump diode array can include a cylindrical lens to focus the pump beam.

In one aspect, the side pumped, passively q-switched monolithic ring laser described above reduces the laser pulses timing jitter by injecting an auxiliary low energy, very short pulse laser 616 at lasing wavelength into the crystal at surface 602. A passively q-switched laser typically experiences microsecond timing jitter. This approach can reduce the timing jitter by two orders of magnitude. This scheme can also force the laser to produce laser light unidirectionally without a employing magnetic field.

Figure 4A:
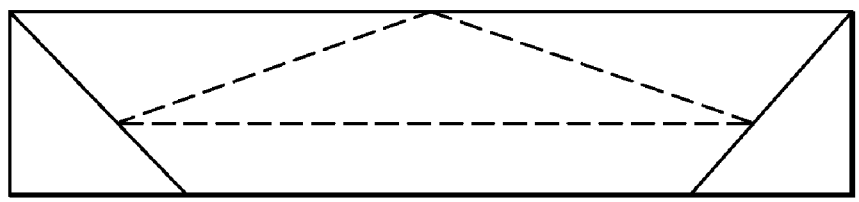
FIGS. 4a and 4b illustrate a side view of a side pumped NPRO crystal.
Figure 4B:
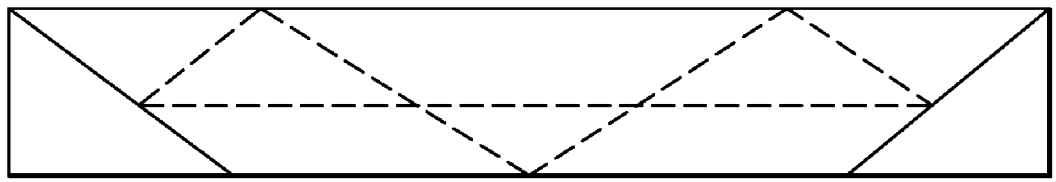

FIG. 4a is the side view of the laser path in the crystal in FIG. 3. The dashed lines represent the path of the laser through the crystal and the solid lines represent surfaces of the crystal. FIG. 4b illustrates one variation of the laser path in the crystal. The laser beam goes along a zig-zag path in the plane of the side pump region. This increases the pump beam and laser beam overlap which effectively increases the laser efficiency. Other variations would include additional reflections. The bottom surface of the crystal can be coated in an appropriate manner to be highly reflective at both the laser wavelength and the pump wavelength. This is typically done by first coating the crystal with a thick $SO_2$ layer, followed by a second coating that is highly reflective at the pump wavelength.

Figure 5:
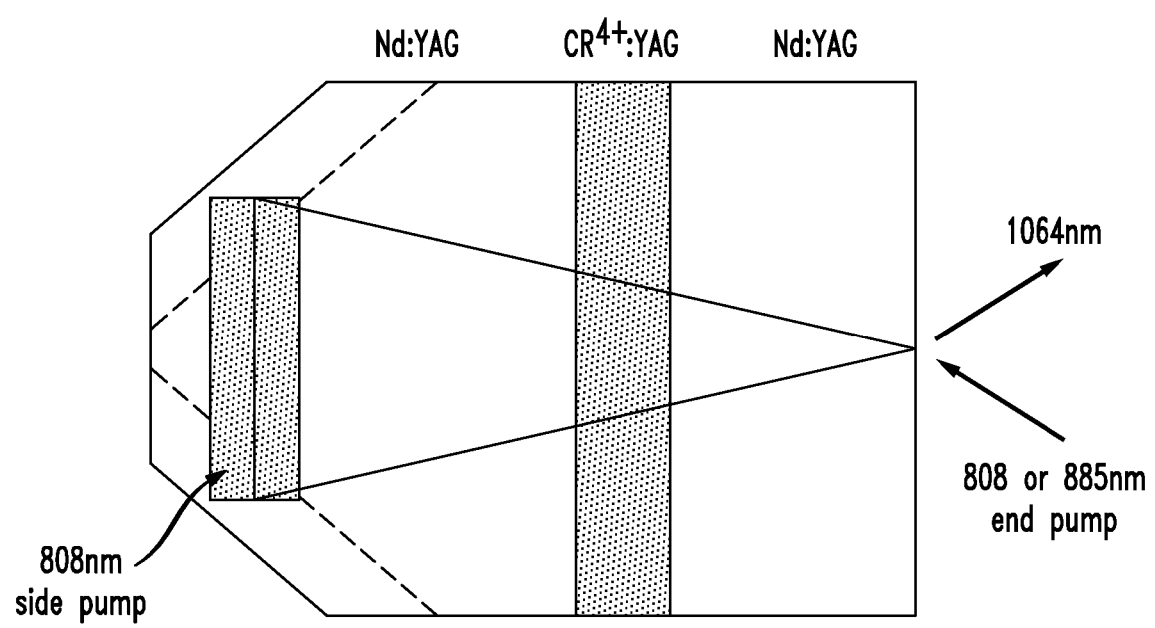
FIG. 5 illustrates an exemplary side pumped NPRO combined with end pump.

FIG. 5 illustrates an exemplary combination of the side pump and end pump of NPRO crystal. Different from the prior art, the laser will not produce laser action with end pumping alone. In application, the end pump serves as mode control when the laser is side pumped with high intensity. It enables a high power output with a single transverse mode. In another application, a high intensity short pump pulse is used to endpump the crystal to reduce the laser timing jitter.

Figure 6:
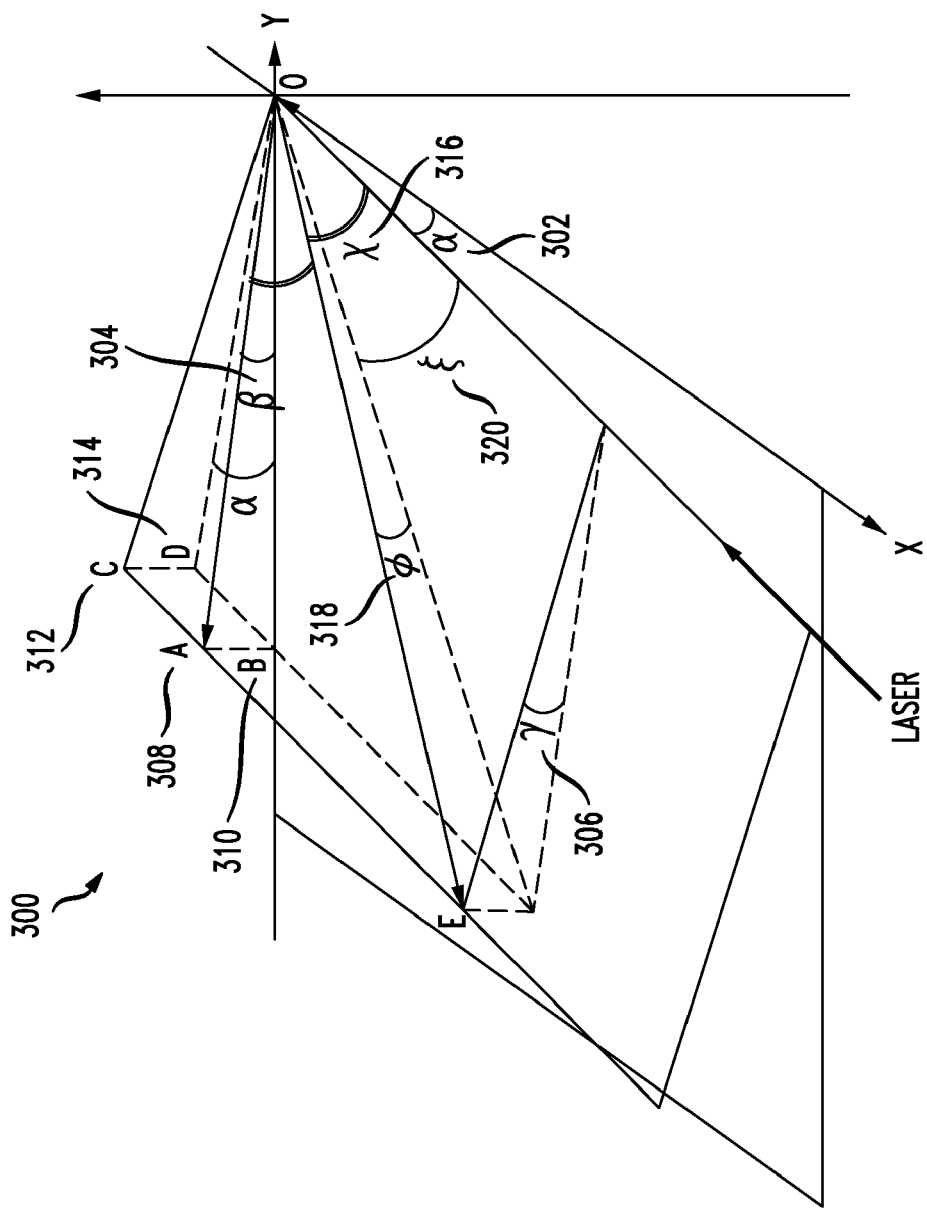
FIG. 6 is a diagram to illustrate the calculations of surface angles related to the crystal design.

FIG. 6 is a diagram to illustrate the crystal design of the monolithic nonplanar ring oscillator (NPRO) 300. FIG. 1 illustrates a 3-dimensional view of the crystal. The origin O in FIG. 6 corresponds to point 506 in FIG. 1. The laser path is along 518 in FIG. 1. OE is surface normal of surface 504 in FIG. 1. Given angles α 302 and β 304, the following equations calculate the elevation angle φ and azimuth angle ξ of surface normal OE. It is important to know that surface OAB is normal to surface XOY.

$$\tan \gamma = \tan \beta / \cos \alpha$$

$$(\sin 2\chi)^2 = 1 - (\cos \beta * \sin \alpha)^2$$

$$\sin \phi = \sin \chi * \sin \gamma$$

$$\cos \xi = \cos \chi / \cos \gamma$$

Figure 7:
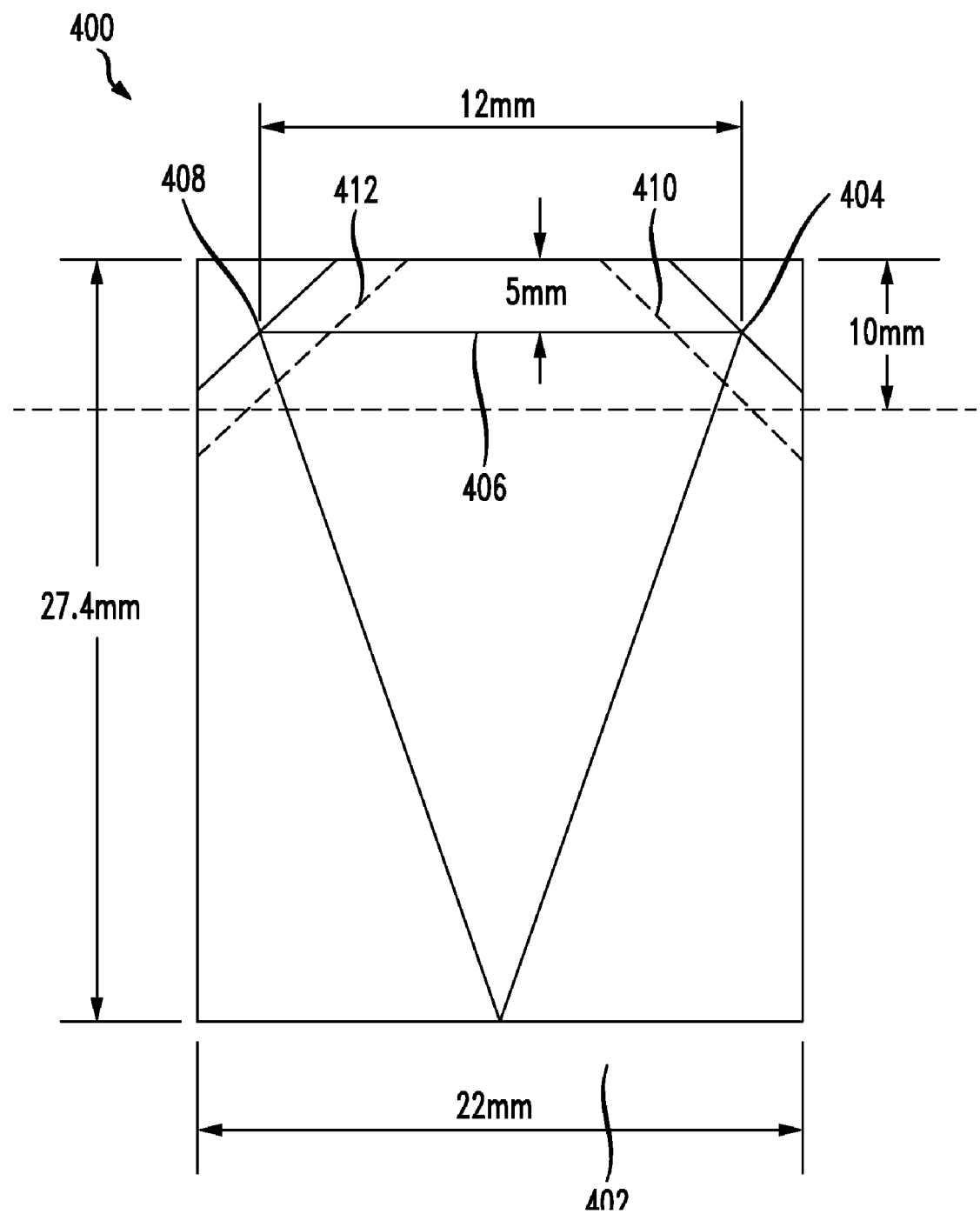
FIG. 7 illustrates sample dimensions for an NPRO crystal.

FIG. 7 illustrates sample dimensions for an NPRO crystal 400. Other scaled and non-scaled variations of these dimensions are contemplated as within the scope of this disclosure. FIG. 7 generally illustrates one exemplary configuration. Other shapes, sizes, and variations are contemplated. The laser originates at the front surface 402 and bounces off a point 404 on a slanted side surface 410. The laser bounces left and up, as if it were bouncing up off the page to a center point 406 in the top of the crystal. At this point the laser continues left and bounces downward to a second point 408 on a second slanted side surface 412 and reflects back to the origin on the front surface 402.

In one embodiment, this side pumped laser is a robust, high power narrow linewidth laser oscillator for space based laser remote sensing applications. When implementing the principles disclosed herein, development can proceed in two phases. The first phase includes building a CW version of the laser and then the pulse version. Achieving oscillation in a CW laser is much easier, and the laser's operation is easier to monitor. To build a CW laser that simulates the pulse laser as closely as possible, the cavity includes undoped YAG where the pulse laser will have $Cr^{4+}$:YAG. This ensures that the optical paths are identical, but pulse operation cannot occur. The CW laser can compare side pumping versus end pumping of the laser and determine the transverse and longitudinal mode stability of the cavity design. After achieving the optimal conditions in the CW laser, the second phase includes constructing the pulse laser with $Cr^{4+}$ doped YAG.

An exemplary rough outline of developmental milestones includes the following four steps: First, design and build a CW NPRO laser using an undoped YAG crystal instead of $Cr^{4+}$:YAG. Second, test the laser's transverse and longitudinal mode stability. Third, replace the undoped YAG crystal with $Cr^{4+}$:YAG to achieve passive Q-switched pulse operation. Fourth, characterize the performance of the laser.

The technology and approach described herein can directly apply to space exploration, several earth and planetary altimeter projects, as well as atmospheric lidars by reducing mode beating and providing a significant increase in laser transmitter reliability and lifetime. One unique feature of this approach is the monolithic NPRO design with a side pump configuration. One advantage of this disclosure is that this laser design can produce higher output power in a much more compact package than is available in the current state of the art.

Figure 8:
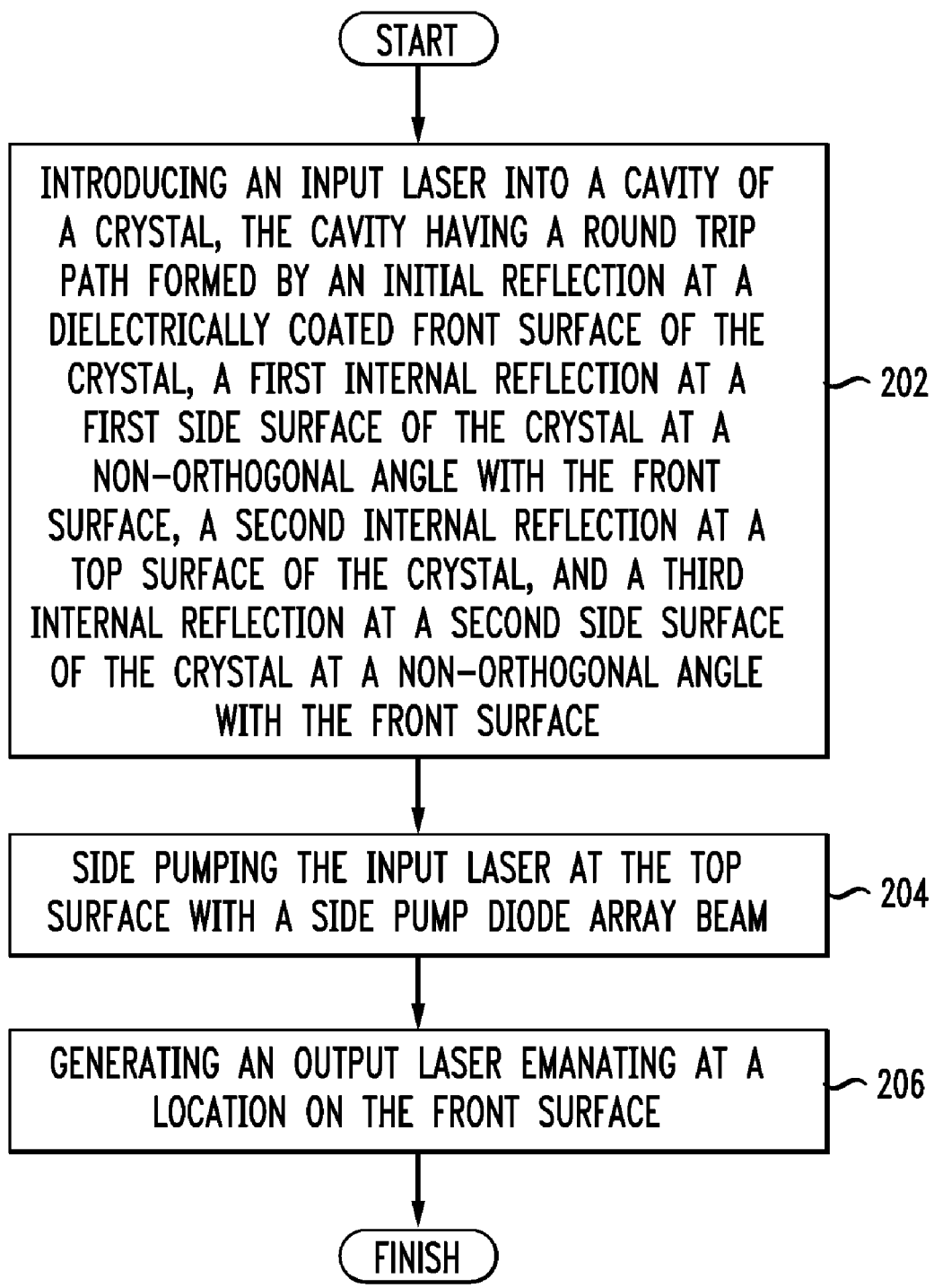
FIG. 8 illustrates an example method embodiment.

Having disclosed some basic system components, the disclosure now turns to the exemplary method embodiment shown in FIG. 8 for generating a laser. For the sake of clarity, the method is discussed in terms of an exemplary system 100 such as is shown in FIG. 9 configured to practice the method. The system 100 introduces an input laser into a cavity of a crystal, the cavity having a round-trip path formed by an initial reflection at a dielectrically coated front surface of the crystal, a first internal reflection at a first side surface of the crystal at a non-orthogonal angle with the front surface, a second internal reflection at a top surface of the crystal, and a third internal reflection at a second side surface of the crystal at a non-orthogonal angle with the front surface (202). Then the system side pumps the input laser at the top surface with a side pump diode array beam (204) and generates an output laser emanating at a location on the front surface (206). The output laser location can emanate from the same location where the input laser is introduced, at a nearby location or at some other location on the front surface of the crystal. In one aspect, the crystal is a neodymium-doped yttrium aluminum garnet (Nd:YAG) crystal. The laser can operate in single longitudinal mode and/or transverse mode. The dielectrically coated front surface can be a saturable absorber such as chromium doped yttrium aluminum garnet (Cr4+:YAG) or other suitable material. The pump diode array can include a cylindrical lens to focus the beam. The side pumped principles disclosed herein can be combined with end pumping, such as with a fiber-coupled diode laser, for increased output power.

With reference to FIG. 9, an exemplary system 100 includes a general-purpose computing device 100, including a processing unit (CPU or processor) 120 and a system bus 110 that couples various system components including the system memory 130 such as read only memory (ROM) 140 and random access memory (RAM) 150 to the processor 120. These and other modules can be configured to control the processor 120 to perform various actions. Other system memory 130 may be available for use as well. It can be appreciated that the disclosure may operate on a computing device 100 with more than one processor 120 or on a group or cluster of computing devices networked together to provide greater processing capability. The processor 120 can include any general purpose processor and a hardware module or software module, such as module 1 162, module 2 164, and module 3 166 stored in storage device 160, configured to control the processor 120 as well as a special-purpose processor where software instructions are incorporated into the actual processor design. The processor 120 may essentially be a completely self-contained computing system, containing multiple cores or processors, a bus, memory controller, cache, etc. A multi-core processor may be symmetric or asymmetric.

The system bus 110 may be any of several types of bus structures including a memory bus or memory controller, a peripheral bus, and a local bus using any of a variety of bus architectures. A basic input/output (BIOS) stored in ROM 140 or the like, may provide the basic routine that helps to transfer information between elements within the computing device 100, such as during start-up. The computing device 100 further includes storage devices 160 such as a hard disk drive, a magnetic disk drive, an optical disk drive, tape drive or the like. The storage device 160 can include software modules 162, 164, 166 for controlling the processor 120. Other hardware or software modules are contemplated. The storage device 160 is connected to the system bus 110 by a drive interface. The drives and the associated computer readable storage media provide nonvolatile storage of computer readable instructions, data structures, program modules and other data for the computing device 100. In one aspect, a hardware module that performs a particular function includes the software component stored in a tangible and/or intangible computer-readable medium in connection with the necessary hardware components, such as the processor 120, bus 110, display 170, and so forth, to carry out the function. The basic components are known to those of skill in the art and appropriate variations are contemplated depending on the type of device, such as whether the device 100 is a small, handheld computing device, a desktop computer, or a computer server.

Although the exemplary embodiment described herein employs the hard disk 160, it should be appreciated by those skilled in the art that other types of computer readable media which can store data that are accessible by a computer, such as magnetic cassettes, flash memory cards, digital versatile disks, cartridges, random access memories (RAMs) 150, read only memory (ROM) 140, a cable or wireless signal containing a bit stream and the like, may also be used in the exemplary operating environment. Tangible computer-readable storage media expressly exclude media such as energy, carrier signals, electromagnetic waves, and signals per se.

To enable user interaction with the computing device 100, an input device 190 represents any number of input mechanisms, such as a microphone for speech, a touch-sensitive screen for gesture or graphical input, keyboard, mouse, motion input, speech and so forth. The input device 190 may be used by the presenter to indicate the beginning of a speech search query. An output device 170 can also be one or more of a number of output mechanisms known to those of skill in the art. In some instances, multimodal systems enable a user to provide multiple types of input to communicate with the computing device 100. The communications interface 180 generally governs and manages the user input and system output. There is no restriction on operating on any particular hardware arrangement and therefore the basic features here may easily be substituted for improved hardware or firmware arrangements as they are developed.

For clarity of explanation, the illustrative system embodiment is presented as including individual functional blocks including functional blocks labeled as a "processor" or processor 120. The functions these blocks represent may be provided through the use of either shared or dedicated hardware, including, but not limited to, hardware capable of executing software and hardware, such as a processor 120, that is purpose-built to operate as an equivalent to software executing on a general purpose processor. For example the functions of one or more processors presented in FIG. 1 may be provided by a single shared processor or multiple processors. (Use of the term "processor" should not be construed to refer exclusively to hardware capable of executing software.) Illustrative embodiments may include microprocessor and/or digital signal processor (DSP) hardware, read-only memory (ROM) 140 for storing software performing the operations discussed below, and random access memory (RAM) 150 for storing results. Very large scale integration (VLSI) hardware embodiments, as well as custom VLSI circuitry in combination with a general purpose DSP circuit, may also be provided.

The logical operations of the various embodiments are implemented as: (1) a sequence of computer implemented steps, operations, or procedures running on a programmable circuit within a general use computer, (2) a sequence of computer implemented steps, operations, or procedures running on a specific-use programmable circuit; and/or (3) interconnected machine modules or program engines within the programmable circuits. The system 100 shown in FIG. 9 can practice all or part of the recited methods, can be a part of the recited systems, and/or can operate according to instructions in the recited tangible computer-readable storage media. Generally speaking, such logical operations can be implemented as modules configured to control the processor 120 to perform particular functions according to the programming of the module. For example, FIG. 9 illustrates three modules Mod1 162, Mod2 164 and Mod3 166 which are modules configured to control the processor 120. These modules may be stored on the storage device 160 and loaded into RAM 150 or memory 130 at runtime or may be stored as would be known in the art in other computer-readable memory locations.

Embodiments within the scope of the present disclosure may also include tangible computer-readable storage media for carrying or having computer-executable instructions or data structures stored thereon. Such computer-readable storage media can be any available media that can be accessed by a general purpose or special purpose computer, including the functional design of any special purpose processor as discussed above. By way of example, and not limitation, such computer-readable media can include RAM, ROM, EEPROM, CD-ROM or other optical disk storage, magnetic disk storage or other magnetic storage devices, or any other medium which can be used to carry or store desired program code means in the form of computer-executable instructions, data structures, or processor chip design. When information is transferred or provided over a network or another communications connection (either hardwired, wireless, or combination thereof) to a computer, the computer properly views the connection as a computer-readable medium. Thus, any such connection is properly termed a computer-readable medium. Combinations of the above should also be included within the scope of the computer-readable media.

Computer-executable instructions include, for example, instructions and data which cause a general purpose computer, special purpose computer, or special purpose processing device to perform a certain function or group of functions. Computer-executable instructions also include program modules that are executed by computers in stand-alone or network environments. Generally, program modules include routines, programs, components, data structures, objects, and the functions inherent in the design of special-purpose processors, etc. that perform particular tasks or implement particular abstract data types. Computer-executable instructions, associated data structures, and program modules represent examples of the program code means for executing steps of the methods disclosed herein. The particular sequence of such executable instructions or associated data structures represents examples of corresponding acts for implementing the functions described in such steps.

Those of skill in the art will appreciate that other embodiments of the disclosure may be practiced in network computing environments with many types of computer system configurations, including personal computers, hand-held devices, multi-processor systems, microprocessor-based or programmable consumer electronics, network PCs, mini-computers, mainframe computers, and the like. Embodiments may also be practiced in distributed computing environments where tasks are performed by local and remote processing devices that are linked (either by hardwired links, wireless links, or by a combination thereof) through a communications network. In a distributed computing environment, program modules may be located in both local and remote memory storage devices.

The various embodiments described above are provided by way of illustration only and should not be construed to limit the scope of the disclosure. For example, the principles herein are applicable to Earth-based altimeters and altimeters for other planets as well as atmospheric lidar systems. Other applications include Doppler wind sensors which require single longitudinal mode operation, and an optical parametric generator which requires a widely tunable infrared source. Those skilled in the art will readily recognize various modifications and changes that may be made to the principles described herein without following the example embodiments and applications illustrated and described herein, and without departing from the spirit and scope of the disclosure. Applications for this design are clearly not limited to space flight.

I claim:

1. A method of generating a laser beam, the method comprising:
    introducing a passively q-switched monolithic ring laser into an optical cavity of a crystal, the cavity having a round-trip path formed by an initial reflection at a dielectrically coated front surface of the crystal, a first internal reflection at a first side surface of the crystal at a non-orthogonal angle with the front surface, a second internal reflection at a top surface of the crystal, and a third internal reflection at a second side surface of the crystal at a non-orthogonal angle with the front surface;
    side pumping the crystal at the top surface with a side pump diode array beam with an end pump serving as mode control when the crystal is side pumped with high intensity, enabling a high power output with a single transverse mode; and
    generating an output laser emanating from the front surface; wherein the side pumped, passively q-switched monolithic ring laser reduces the laser pulses timing jitter by injecting an auxiliary low energy, very short pulse laser at a lasing wavelength into the crystal.

2. The method of claim 1, wherein a zig-zag path reflected by top and bottom surfaces of the crystal replaces the second internal reflection at the top surface of the crystal.

3. The method of claim 1, wherein the crystal is neodymium-doped yttrium aluminum garnet (Nd:YAG).

4. The method of claim 1, wherein the laser operates in single longitudinal mode.

5. The method of claim 1, wherein the laser operates in transverse mode.

6. The method of claim 1, wherein the optical cavity includes a region comprised of a saturable absorber.

7. The method of claim 6, wherein the saturable absorber is made of chromium doped yttrium aluminum garnet ($Cr^{(4+)}$:YAG).

8. The method of claim 1, the method further comprising end pumping in a mode-selective scheme with diode laser at an absorption wavelength of the crystal.

9. The method of claim 1, the method further comprising end pumping in a timing control scheme with a short pulse laser at the crystal laser wavelength.

10. The method of claim 1, wherein a cylindrical lens focuses the pump diode array beam on the top or bottom surface.

11. A system for generating a laser beam, the system comprising:
    a processor;
    a module configured to control the processor to introduce a laser into an optical cavity of a crystal, the cavity having a round-trip path formed by an initial reflection at a dielectrically coated front surface of the crystal, a first internal reflection at a first side surface of the crystal at a non-orthogonal angle with the front surface, a second internal reflection at a top surface of the crystal, and a third internal reflection at a second side surface of the crystal at a non-orthogonal angle with the front surface;
    a module configured to control the processor to side pump the crystal at the top surface with a side pump diode array beam with an end pump serving as mode control when the crystal is side pumped with high intensity, enabling a high power output with a single transverse mode; and a module configured to control the processor to generate an output laser emanating from the front surface generating an output laser emanating from the front surface; wherein the side pumped, passively q-switched monolithic ring laser reduces the laser pulses timing jitter by injecting an auxiliary low energy, very short pulse laser at a lasing wavelength into the crystal.

12. The system of claim 11, wherein the optical cavity includes a region comprised of a saturable absorber.

13. The system of claim 12, wherein the saturable absorber is made of chromium doped yttrium aluminum garnet ($Cr^{(4+)}$:YAG).

14. The system of claim 11, the system further comprising a module configured to control the processor to end pump in a mode-selective scheme with diode laser at an absorption wavelength of the crystal.

15. The system of claim 11, the system further comprising a module configured to control the processor to end pump in a timing control scheme with a short pulse laser at the crystal laser wavelength.

16. The system of claim 11, the system further comprising a cylindrical lens which focuses the pump diode array beam on the top or bottom surface.

17. A tangible non-transitory computer-readable storage medium storing a computer program having instructions for controlling a processor to generate a laser beam, the instructions causing a processor to perform the steps:
    introducing a laser into an optical cavity of a crystal, the cavity having a round-trip path formed by an initial reflection at a dielectrically coated front surface of the crystal, a first internal reflection at a first side surface of the crystal at a non-orthogonal angle with the front surface, a second internal reflection at a top surface of the crystal, and a third internal reflection at a second side surface of the crystal at a non-orthogonal angle with the front surface;
    side pumping the crystal at the top surface with a side pump diode array beam with an end pump serving as mode control when the crystal is side pumped with high intensity, enabling a high power output with a single transverse mode; and
    generating an output laser emanating from the front surface generating an output laser emanating from the front surface; wherein the side pumped, passively q-switched monolithic ring laser reduces the laser pulses timing jitter by injecting an auxiliary low energy, very short pulse laser at a lasing wavelength into the crystal.

18. The tangible computer-readable storage medium of claim 17, wherein a zig-zag path reflected by top and bottom surfaces of the crystal replaces the second internal reflection at the top surface of the crystal.

19. The tangible computer-readable storage medium of claim 17, wherein the crystal is neodymium-doped yttrium aluminum garnet (Nd:YAG).

20. The tangible computer-readable storage medium of claim 17, wherein the laser operates in single longitudinal mode.

* * * * *